(12) United States Patent
Hirose et al.

(10) Patent No.: US 11,708,488 B2
(45) Date of Patent: Jul. 25, 2023

(54) POLYESTER COMPOSITION, POLYESTER FILM, AND MAGNETIC RECORDING MEDIUM

(71) Applicant: TOYOBO FILM SOLUTIONS LIMITED, Tokyo (JP)

(72) Inventors: Amane Hirose, Tokyo (JP); Junichi Togasaki, Osaka (JP); Makoto Handa, Tokyo (JP); Tatsuya Ogawa, Osaka (JP); Shigeyuki Watanabe, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 195 days.

(21) Appl. No.: 17/273,889

(22) PCT Filed: Aug. 29, 2019

(86) PCT No.: PCT/JP2019/033953
§ 371 (c)(1),
(2) Date: Mar. 5, 2021

(87) PCT Pub. No.: WO2020/054450
PCT Pub. Date: Mar. 19, 2020

(65) Prior Publication Data
US 2021/0332233 A1    Oct. 28, 2021

(30) Foreign Application Priority Data

Sep. 14, 2018 (JP) ................... 2018-172110

(51) Int. Cl.
| | | |
|---|---|---|
| *C08L 67/02* | (2006.01) | |
| *G11B 5/73* | (2006.01) | |
| *C08G 63/189* | (2006.01) | |
| *B32B 27/36* | (2006.01) | |
| *C08L 79/08* | (2006.01) | |

(52) U.S. Cl.
CPC .............. *C08L 67/02* (2013.01); *B32B 27/36* (2013.01); *C08G 63/189* (2013.01); *G11B 5/73927* (2019.05); *B32B 2307/208* (2013.01); *C08L 79/08* (2013.01); *C08L 2203/16* (2013.01)

(58) Field of Classification Search
None
See application file for complete search history.

(56) References Cited

U.S. PATENT DOCUMENTS

| | | | | |
|---|---|---|---|---|
| 3,091,600 A | * | 5/1963 | Caldwell .............. | C08G 63/199 528/307 |
| 5,330,051 A | * | 7/1994 | Dangler ........... | G11B 23/08778 220/4.23 |
| 5,539,078 A | * | 7/1996 | Burkett ................ | C08G 63/189 528/277 |
| 11,017,809 B2 | * | 5/2021 | Yamaga ............... | G11B 5/7334 |
| 2009/0123756 A1 | * | 5/2009 | Hashimoto ............. | B32B 21/08 428/480 |
| 2011/0039127 A1 | * | 2/2011 | Kinoshita ............... | B32B 27/08 428/141 |
| 2011/0135965 A1 | | 6/2011 | Tanaka et al. | |
| 2012/0301717 A1 | * | 11/2012 | Takahira ................ | C09J 163/00 524/604 |
| 2019/0180781 A1 | * | 6/2019 | Handa .................... | G11B 5/012 |
| 2021/0032401 A1 | * | 2/2021 | Hirose .................... | B32B 7/022 |

FOREIGN PATENT DOCUMENTS

| | | | |
|---|---|---|---|
| JP | H06-145376 A | | 5/1994 |
| JP | H08-106623 A | | 4/1996 |
| JP | 2001-118240 A | | 4/2001 |
| JP | 2001-323140 A | | 11/2001 |
| JP | 2008-081533 A | | 4/2008 |
| JP | 2012-082379 A | | 4/2012 |
| JP | 2013-091686 A | | 5/2013 |
| JP | 2013-173870 A | | 9/2013 |
| JP | 2013173870 A | * | 9/2013 |

OTHER PUBLICATIONS

European Patent Office, Extended European Search Report in European Patent Application No. 19860191.6 (dated Apr. 22, 2022).
Japanese Patent Office, International Preliminary Report on Patentability in International Patent Application No. PCT/JP2019/033953 (dated Mar. 9, 2021).
Japanese Patent Office, International Search Report in International Patent Application No. PCT/JP2019/033953 (dated Nov. 19, 2019).
Japan Patent Office, Office Action in Japanese Patent Application No. 2019-165199 (dated Feb. 20, 2023).

* cited by examiner

*Primary Examiner* — Kevin M Bernatz
(74) *Attorney, Agent, or Firm* — Leydig, Voit & Mayer, Ltd.

(57) ABSTRACT

The invention provides a polyester composition in which the primary repeating units contain an aromatic dicarboxylic acid component (Component A) and an ethylene glycol component (Component C) and a long-chain alkyl dicarboxylic acid component having not less than 6 carbons (Component B) or a long-chain alkyl diol component having not less than 6 carbons (Component D), wherein a sum (WB+WD) of a relative amount (WB) of Component B as calculated based on a total number of moles of Component A and Component B plus a relative amount (WD) of Component D as calculated based on a total number of moles of Component C and Component D are within a range of 2-13 mol %. The invention also provides a polyester film prepared from the polyester composition and having excellent dimensional stability, as well as a magnetic recording medium utilizing the polyester film.

19 Claims, No Drawings

POLYESTER COMPOSITION, POLYESTER FILM, AND MAGNETIC RECORDING MEDIUM

CROSS-REFERENCE TO RELATED APPLICATIONS

This patent application is the U.S. national phase of International Patent Application No. PCT/JP2019/033953, filed Aug. 29, 2019, which claims the benefit of Japanese Patent Application No. 2018-172110, filed on Sep. 14, 2018, which are incorporated by reference in their entireties herein.

TECHNICAL FIELD

The present invention relates to a magnetic recording medium, polyester film, and polyester composition employing a polyester copolymer in which a specific long-chain dicarboxylic acid component or long-chain diol component is copolymerized.

BACKGROUND ART

Because aromatic polyesters typified by polyethylene terephthalate and polyethylene-2,6-naphthalenedicarboxylate have excellent mechanical properties, dimensional stability, and heat resistance, they are widely employed in films and so forth. Because the mechanical properties, dimensional stability, and heat resistance of polyethylene-2,6-naphthalate are in particular superior to those of polyethylene terephthalate, it is used as base film and so forth in demanding applications where such properties are required, such as is the case with high-density magnetic recording media and so forth, for example.

In recent years, there has been intense demand for improvement in the recording density of magnetic recording media and so forth, in accompaniment to which the situation has developed to the point where the dimensional stability that was sought in base films could no longer be achieved not only by polyethylene terephthalate but even by polyethylene-2,6-naphthalate.

There have therefore been proposals such as those for improving dimensional stability with respect to changes in humidity through the copolymerization of a 4,4'-(alkylenedioxy)bisbenzoic acid component as at Patent Reference No. 1, copolymerization of a 2,6-naphthalenedicarboxylic acid component (Component A) with a terephthalic acid component, isophthalic acid component, or 1,4-cyclohexanedicarboxylic acid component (Component B), and an ethylene glycol component serving as glycol component (Component C) and an aliphatic dimer diol component (Component D) as at Patent Reference No. 2, and so forth.

At Patent Reference No. 3, to achieve superior surface characteristics, slipperiness, and heat resistance, this was achieved through addition of a small amount of stearyl stearate, behenyl behenate, or other such aliphatic ester compound.

PRIOR ART REFERENCES

Patent References

PATENT REFERENCE NO. 1: Japanese Patent Application Publication Kokai No. 2012-268375

PATENT REFERENCE NO. 2: Japanese Patent Application Publication Kokai No. 2013-173870

PATENT REFERENCE NO. 3: Japanese Patent Application Publication Kokai No. 2001-323140

SUMMARY OF INVENTION

Problem to be Solved by Invention

However, with respect to Patent Reference No. 1, the structure of the 4,4'-(alkylenedioxy)bisbenzoic acid component is extremely complicated, and the raw materials are obtained only with difficulty. Furthermore, the copolymer at Patent Reference No. 2 is extremely complicated, and there have been problems such as the fact that as there are many aliphatic dimer diols that employ vegetable oils as raw material, there is a relatively strong tendency for impurities to be present therein. Furthermore, with respect to Patent Reference No. 3, while it is disclosed that from the standpoints of moldability and lubricity an aliphatic ester compound that contains a long-chain alkyl group should be copolymerized therewith, due to the need to avoid problems caused by bleedout, it has been the case that the amount that has actually been added thereto has been extremely small.

It is therefore an object of the present invention to provide a polyester composition that will make it possible to more easily provide a polyester film having excellent dimensional stability, especially dimensional stability with respect to changes in environment, e.g., changes in humidity, as well as a magnetic recording medium and polyester film employing same.

Means for Solving Problem

In the context of polyester films, the coefficient of expansion due to humidity and the coefficient of expansion due to temperature both have an extremely intimate relationship with Young's modulus, it ordinarily being the case that these will be lower the higher that the Young's modulus is. However, it is not the case that Young's modulus can be made as high as one likes, there being an inherent limit thereto from the perspective of film formability and of maintaining Young's modulus in the perpendicular direction. Intensive study was therefore made into whether it might not be possible to obtain a film having, for the same Young's modulus, a lower coefficient of expansion with respect to temperature and humidity, and intensive study was made into whether it might not be possible to obtain a polyester exhibiting a low coefficient of expansion due to humidity without using raw materials such as the aforementioned polyethylene-1,2-diphenoxyethane-4,4'-dicarboxylate which can be obtained or synthesized only with difficulty.

Furthermore, copolymerization which might be carried out to reduce the coefficient of expansion due to humidity causes increase in the elongation of the film at 110° C. Increase in the elongation of the film causes occurrence of uneven coating during operations in which coating of magnetic layers and so forth is carried out. An intensive search was therefore conducted in an attempt to find copolymer components such as might cause elongation of the film at 110° C. to be as low as possible while also reducing the coefficient of expansion due to humidity.

As a result, the present inventor(s) arrived at the present invention upon making the surprising discovery that a polyester film having a low coefficient of expansion due to humidity could be obtained when specific relative amount(s)

of specific long-chain dicarboxylic acid component(s) and/or long-chain diol component(s) are copolymerized therewith.

The present invention thus provides the polyester resin compositions described at (1) and (2), below; the polyester films described at (3) through (7), below; and the magnetic recording medium described at (8), below.

(1) A polyester composition in which the primary repeating units therein comprise an aromatic dicarboxylic acid component (Component A) and an ethylene glycol component (Component C); a long-chain alkyl dicarboxylic acid component having not less than 6 carbons (Component B) or a long-chain alkyl diol component having not less than 6 carbons (Component D) is present therein; and a sum (WB+WD) of a relative amount (WB) of Component B as calculated based on a total number of moles of Component A and Component B plus a relative amount (WD) of Component D as calculated based on a total number of moles of Component C and Component D is within a range that is 2 mol % to 13 mol %.

(2) The polyester composition according to (1) wherein at least one species selected from among a group consisting of polyimide, polyether imide, polyether ketone, and polyether ether ketone is made to be present therein in an amount within a range that is 0.5 wt % to 25 wt % as calculated based on mass of the polyester composition.

(3) A polyester film wherein the polyester composition according to (1) or (2) is employed in at least one layer thereof.

(4) The polyester film according to (3) wherein Young's modulus in at least one surfacial direction of the film is not less than 4.5 GPa.

(5) The polyester film according to (3) wherein percent elongation in a long direction of the film at 110° C. is not greater than 3.0%.

(6) The polyester film according to any of (3) through (5) wherein coefficient of expansion due to humidity in at least one surfacial direction of the film is 1 ppm/% RH to 10.0 ppm/% RH; and coefficient of expansion due to temperature in at least one direction is within a range that is not greater than 14 ppm/° C.

(7) The polyester film according to any of (3) through (6) that is capable of being used in a base film for a magnetic recording medium.

(8) A magnetic recording medium comprising the polyester film according to (7) and a magnetic layer formed on one surface thereof.

BENEFIT OF INVENTION

The present invention makes it possible to provide a polyester film which more easily permits achievement of dimensional stability, and in particular excellent dimensional stability with respect to changes in environment, e.g., changes in temperature and/or humidity, and in which the percent elongation of the film at 110° C. is moreover low, and which is such that uneven coating during coating operations tends not to occur.

Accordingly, the present invention provides a film which is suitable for applications in which a high degree of dimensional stability—including with respect to the effects of humidity and temperature—is sought, and which is especially suitable for use as base film for high-density magnetic recording media or the like. In addition, using the film of the present invention, it is also possible provide high-density magnetic recording media and so forth having excellent dimensional stability.

EMBODIMENTS FOR CARRYING OUT INVENTION

Polyester Copolymer

The polyester copolymer of the present invention is such that the primary repeating units therein comprise aromatic dicarboxylic acid component(s) and glycol component(s).

Firstly, in specific terms, the aforementioned aromatic dicarboxylic acid component is an aromatic component having not less than 6 carbons; e.g., those having a phenylene group or a naphthalenediyl group, examples of which that may be cited including terephthalic acid components, isophthalic acid components, 2,6-naphthalenedicarboxylic acid components, 2,7-naphthalenedicarboxylic acid components, and so forth. Among these, from the perspective of the benefit to be produced by the present invention, 2,6-naphthalenedicarboxylic acid components and terephthalic acid components, for which improvement of mechanical strength and/or other such properties is comparatively easy, are preferred, 2,6-naphthalenedicarboxylic acid components being particularly preferred.

The aforementioned glycol component is ethylene glycol, it being possible for the ethylene glycol to contain diethylene glycol.

It is characteristic of the present invention for improvement of dimensional stability that in addition to the aforementioned primary repeating units which comprise aromatic dicarboxylic acid component and ethylene glycol component there is present therewithin a specific amount of a long-chain dicarboxylic acid or long-chain diol component.

The long-chain dicarboxylic acid comprises not less than 6 carbons, it being preferred that the skeleton thereof not contain a branched chain. It is preferred that the long-chain dicarboxylic acid component have 6 to 14 carbons. This is because it would be difficult to obtain were the component to have more than 14 carbons, the reason being that it would no longer be possible to expect convenient improvement of properties were this to be the case. Furthermore, introduction of a component having more than 14 carbons would make it difficult to achieve a high Young's modulus.

The long-chain diol comprises not less than 6 carbons, it being preferred that the skeleton thereof not contain a branched chain. It is preferred that the long-chain diol have 6 to 14 carbons. This is because, as was the case with the aforementioned long-chain dicarboxylic acid, it would be difficult to obtain were the component to have more than 14 carbons. Furthermore, introduction of a component having more than 14 carbons would make it difficult to achieve a high Young's modulus.

To the extent that it does not impair the benefit of the present invention, note that the polyester copolymer of the present invention may be copolymerized with copolymer component(s) that are themselves known; e.g., aliphatic dicarboxylic acid component(s), alicyclic dicarboxylic acid component(s), alkylene glycol component(s) not corresponding to any of the foregoing, hydroxycarboxylic acid component(s), alcohol component(s) and/or acid component(s) having trifunctional or higher functional groups such as trimellitic acid and/or the like. From such standpoint, it is preferred from the perspectives of the dimensional stability of the product that is obtained and film formability that the relative amount of diethylene glycol component(s) within the ethylene glycol component be within a range that is 0.5 mol % to 3 mol % as calculated based on the number of moles of all aromatic dicarboxylic acid components. It is particularly preferred that this be within a range that is 1.0 mol % to 2.5 mol %.

Furthermore, it is characteristic of the polyester copolymer of the present invention that, with respect to the aromatic dicarboxylic acid component (Component A), the ethylene glycol component (Component C), the long-chain alkyl dicarboxylic acid component having not less than 6 carbons (Component B), and the long-chain alkyl diol component having not less than 6 carbons (Component D), the aforementioned long-chain dicarboxylic acid and long-chain diol are copolymerized therewithin such that the sum (WB+WD) of the relative amount (WB) of Component B as calculated based on the total number of moles of Component A and Component B plus the relative amount (WD) of Component D as calculated based on the total number of moles of Component C and Component D is within a range that is 2 mol % to 13 mol %. When the relative amount of the aforementioned long-chain dicarboxylic acid or long-chain diol component is below the lower limit of the range in values therefor, it will be difficult to achieve the benefit whereby the coefficient of expansion due to humidity is reduced and so forth. On the other hand, when the upper limit of the range in values therefor is exceeded, film formability is impaired, it will be difficult to achieve improvement in Young's modulus and other such mechanical properties due to stretching, it will be difficult to lower the coefficient of expansion due to temperature, and in a worst-case scenario there may be occurrence of breakage during stretching or other such film forming operations.

Furthermore, surprisingly, the benefit whereby the coefficient of expansion due to humidity is reduced through use of a specific long-chain dicarboxylic acid component or long-chain diol component can be efficiently achieved even with a comparatively small amount thereof. From such standpoint, preferred upper limits of the range in values for the relative amounts of the specific long-chain dicarboxylic acid component and long-chain diol component that may be present therewithin are respectively not greater than 13.0 mol %, not greater than 12.0 mol %, not greater than 11.0 mol %, not greater than 10.0 mol %, and not greater than 9.0 mol %; and preferred lower limits thereof are respectively not less than 0.5 mol %, not less than 1.0 mol %, not less than 2.0 mol %, not less than 3.0 mol %, not less than 4.0 mol %, and not less than 5.0 mol %. That is, preferred upper limits of the range in values for the aforementioned relative amount (WB) of Component B are not greater than 13.0 mol %, not greater than 12.0 mol %, not greater than 11.0 mol %, not greater than 10.0 mol %, and not greater than 9.0 mol %; and preferred lower limits thereof are not less than 0.5 mol %, not less than 1.0 mol %, not less than 2.0 mol %, not less than 3.0 mol %, not less than 4.0 mol %, and not less than 5.0 mol %. Preferred upper limits of the range in values for the aforementioned relative amount (WD) of Component D are not greater than 13.0 mol %, not greater than 12.0 mol %, not greater than 11.0 mol %, not greater than 10.0 mol %, and not greater than 9.0 mol %; and preferred lower limits thereof are not less than 0.5 mol %, not less than 1.0 mol %, not less than 2.0 mol %, not less than 3.0 mol %, not less than 4.0 mol %, and not less than 5.0 mol %.

Use of a polyester copolymer in which such specific amount(s) of specific long-chain dicarboxylic acid component and/or long-chain diol component are copolymerized will make it possible to manufacture a molded part, e.g., film or the like, in which the coefficient of expansion due to temperature and the coefficient of expansion due to humidity are both low.

Note that the copolymerized amount(s) of the aforementioned specific long-chain dicarboxylic acid component and long-chain diol component may be adjusted by adjusting raw material composition so as to obtain the desired copolymerized amount(s) at the polymerization stage, or adjustment may be carried out by, for example, preparing a homopolymer employing only the aforementioned specific long-chain dicarboxylic acid component as the dicarboxylic acid component or a polymer in which there is a large copolymerized amount thereof, and a polymer that has not been copolymerized or a polymer in which there is a small copolymerized amount, and causing transesterification to proceed by melt kneading these so as to obtain the desired copolymerized amount(s).

Polyester Copolymer Resin Manufacturing Method

A method for manufacturing a polyester copolymer in accordance with the present invention will now be described in detail.

The aforementioned specific long-chain dicarboxylic acid component and long-chain diol component are respectively commercially available, examples of which that may be cited including dimethyl sebacate manufactured by Hokoku Corporation, dodecanedioic acid manufactured by Ube Industries, Ltd., hexanediol manufactured by Ube Industries, Ltd., dodecanediol manufactured by Hokoku Corporation, and so forth. Furthermore, it is preferred that the purity of the respective long-chain dicarboxylic acid compound(s) and/or long-chain diol compound(s) be not less than 95%, more preferred that this be not less than 96%, and particularly preferred that this be not less than 97%.

Furthermore, polyester copolymer in accordance with the present invention may be obtained by subjecting polyester precursor(s) to a polycondensation reaction. More specifically, an aromatic dicarboxylic acid component having not less than 6 carbons, e.g., dimethyl 2,6-naphthalenedicarboxylate, and a specific long-chain dicarboxylic acid, and ethylene glycol, and a specific long-chain diol may be subjected to a transesterification reaction to obtain polyester precursor. Manufacture can be accomplished by thereafter causing the polyester precursor thus obtained to be polymerized in the presence of a polymerization catalyst, it being possible to carry out solid-state polymerization and/or the like as necessary. When a P-chlorophenol/1,1,2,2-tetrachloroethane (wt % ratio 40/60) solvent mixture is used to measure the intrinsic viscosity at 35° C. of the aromatic polyester thus obtained, from the perspective of the benefit to be produced by the present invention it is preferred that this be within a range that is 0.4 dl/g to 1.5 dl/g, more preferred that this be within a range that is 0.5 dl/g to 1.2 dl/g, and particularly preferred that this be within a range that is 0.55 dl/g to 0.8 dl/g.

Furthermore, it is preferred that the reaction temperature at the time that the polyester precursor is manufactured be such that this be carried out within a range that is 190° C. to 250° C., this being carried out at normal pressure or under pressurized conditions. Below 190° C., the reaction will tend not to proceed adequately; above 250° C., there will be a tendency for diethylene glycol and/or other such products of side reactions to be produced.

Note that known esterification and/or transesterification catalyst(s) may be employed during operations in which reaction is carried out for manufacture of the polyester precursor. Manganese acetate, zinc acetate, alkali metal compounds, alkaline earth metal compounds, titanium compounds, and so forth may be cited as examples. A titanium compound capable of suppressing high surface protrusions at the time that this is made into a film is preferred.

The polycondensation reaction will next be described. Firstly, polycondensation temperature is not less than the melting point of the polymer obtained but 230° to 300° C. or less, it being more preferred that this be within a range from a temperature that is 5° C. or more above the melting point to a temperature that is 30° C. above the melting point. It is preferred that the polycondensation reaction be carried out under vacuum conditions that are ordinarily not greater than 100 Pa.

As polycondensation catalyst, metal compounds containing at least one metallic element may be cited as examples. Note that polycondensation catalyst(s) may also be used during the esterification reaction. As metallic elements, titanium, germanium, antimony, aluminum, nickel, zinc, tin, cobalt, rhodium, iridium, zirconium, hafnium, lithium, calcium, magnesium, and so forth may be cited as examples. More preferred as metals are titanium, germanium, antimony, aluminum, tin, and so forth; it being the case as described above that use of titanium compounds will in particular, due to the influence of the metal which remains following use thereof as a catalyst at the time when this is made into a film, permit suppression of high protrusions at the surface, use thereof is preferred.

Any one of such catalysts may be used alone or these may be used in combination. The amount of such catalyst is 0.001 mol % to 0.1 mol % of the number of moles of the repeating units in the polyester copolymer, 0.005 mol % to 0.05 mol % thereof being more preferred.

As specific examples of titanium compounds that may serve as esterification catalyst, transesterification catalyst, and/or polycondensation catalyst, tetra-n-propyl titanate; tetraisopropyl titanate; tetra-n-butyl titanate; tetraisobutyl titanate; tetra-tert-butyl titanate; tetracyclohexyl titanate; tetraphenyl titanate; tetrabenzyl titanate; lithium oxalate titanate; potassium oxalate titanate; ammonium titanate oxalate; titanium oxide; orthoesters and condensed orthoesters of titanium; reaction products comprising hydroxycarboxylic acid and an orthoester or condensed orthoester of titanium; reaction products comprising hydroxycarboxylic acid, a phosphorus compound, and an orthoester or condensed orthoester of titanium; reaction products comprising a base, a 2-hydroxycarboxylic acid, or a polyhydric alcohol having at least two hydroxyl groups and an orthoester or condensed orthoester of titanium; and so forth may be cited.

In addition, as described above, the polyester copolymer of the present invention is such that polymerization may be carried out so as to obtain a polyester copolymer having the desired copolymerized amounts; or, because transesterification proceeds at the time of melt kneading, this may be prepared by causing two or more varieties of aromatic polyesters having different copolymerized amounts to be prepared, and melt kneading and blending these therein so as to obtain the desired copolymerized amounts.

Polyester Composition

At the polyester composition of the present invention, the primary repeating units comprise an aromatic dicarboxylic acid component (Component A) and an ethylene glycol component (Component C), a long-chain alkyl dicarboxylic acid component having not less than 6 carbons (Component B) or a long-chain alkyl diol component having not less than 6 carbons (Component D) being present therein, the sum (WB+WD) of the relative amount (WB) of Component B as calculated based on the total number of moles of Component A and Component B plus the relative amount (WD) of Component D as calculated based on the total number of moles of Component C and Component D being within a range that is 2 mol % to 13 mol %. Preferred upper limits of the range in values for the aforementioned relative amount (WB) of Component B are not greater than 13.0 mol %, not greater than 12.0 mol %, not greater than 11.0 mol %, not greater than 10.0 mol %, and not greater than 9.0 mol %; and preferred lower limits thereof are not less than 0.5 mol %, not less than 1.0 mol %, not less than 2.0 mol %, not less than 3.0 mol %, not less than 4.0 mol %, and not less than 5.0 mol %. Preferred upper limits of the range in values for the aforementioned relative amount (WD) of Component D are not greater than 13.0 mol %, not greater than 12.0 mol %, not greater than 11.0 mol %, not greater than 10.0 mol %, and not greater than 9.0 mol %; and preferred lower limits thereof are not less than 0.5 mol %, not less than 1.0 mol %, not less than 2.0 mol %, not less than 3.0 mol %, not less than 4.0 mol %, and not less than 5.0 mol %.

It is preferred that the polyester composition of the present invention contain the aforementioned polyester copolymer. To the extent that it does not interfere with the benefit of the present invention, note that additive(s) and/or other resin(s) that are themselves known may be blended within the composition. As additive(s), ultraviolet light absorbers and other such stabilizers, antioxidants, plasticizers, lubricants, flame retardants, mold release agents, pigments, nucleating agents, and fillers, or glass fibers, carbon fibers, layered silicates, and/or the like may be cited as examples, these being chosen as appropriate in correspondence to the requirements of the intended usage. Furthermore, as other resin(s), aliphatic polyester-type resins, polyamide-type resins, polycarbonates, ABS resins, liquid crystalline resins, polymethyl methacrylates, polyamide-type elastomers, polyester-type elastomers, polyether imides, polyimides, and so forth may be cited.

Moreover, besides the aforementioned polyester copolymer, other thermoplastic resin(s) may be further blended within the polyester composition of the present invention within a range that is 0.5 wt % to 25 wt %. It is to be expected that blending thereof may produce a benefit whereby reduction in elongation and so forth of the film when coated with magnetic layer(s) and/or the like is made possible due to increase in the glass transition temperature and/or other such heat-resistant properties. As thermoplastic resin(s) that may be blended therein, polyimides, polyether imides, polyether ketones, polyether ether ketones, and so forth may be cited, polyether imides being preferred. Because if the blended amount is too small there will be little benefit in terms of improvement in heat resistance, while if it is too large there will be occurrence of phase separation, the content thereof is ordinarily held to a range that is 0.5 wt % to 25 wt % as calculated based on the mass of the polyester copolymer resin composition. It is preferred that this be 2 wt % to 20 wt %, more preferred that this be 4 wt % to 18 wt %, and still more preferred that this be 5 wt % to 15 wt %. As specific examples of polyether imides, note that those disclosed at Japanese Patent Application Publication Kokai No. 2000-355631 and so forth may be cited. Furthermore, from the standpoint of further improving dimensional stability with respect to changes in environment, copolymers of the 6,6'-(ethylenedioxy)di-2-naphthoic acid component, 6,6'-(trimethylenedioxy)di-2-naphthoic acid component, or 6,6'-(butylenedioxy)di-2-naphthoic acid component described in the pamphlet of International Patent Application Publication No. 2008/096612 and so forth are also preferred.

Film

Because it will facilitate increase in Young's modulus and so forth, described below, it is preferred that the polyester film of the present invention be stretched oriented film, and it is particularly preferred that it be biaxially oriented polyester film that has been subjected to orientation in two perpendicular directions. For example, this might be prepared by causing the aforementioned polyester composition to be melted and formed into a film which is then extruded in sheet-like fashion, stretching being carried out in the film forming direction (hereinafter sometimes referred to as the vertical direction, long direction, or MD direction) and a direction which is perpendicular thereto (hereinafter sometimes referred to as the width direction, horizontal direction, or TD direction).

Furthermore, the polyester film of the present invention is not limited to being a single layer but may be a laminated film, in which case it should be readily understood that it is sufficient that at least one layer be a film layer comprising the aforementioned polyester composition of the present invention.

Moreover, from the perspective of achieving superior dimensional stability, it is preferred that the polyester film of the present invention be such that the coefficient of expansion due to temperature ($\alpha t$) of the film in at least one of the surfacial directions thereof be not greater than 14 ppm/° C. Note that by causing the coefficient of expansion due to temperature ($\alpha t$) in the width direction of the film to preferably be such that the coefficient of expansion due to temperature in at least one direction of the film is not greater than the upper limit of the range in values therefor, it will be possible, e.g., by causing this to conform to the direction of the film in which dimensional stability is most sought, to achieve a film that will make it possible to attain superior dimensional stability with respect to changes in environment. The preferred lower limit of the range in values for the coefficient of expansion due to temperature ($\alpha t$) is not less than −10 ppm/° C., more preferred is not less than −7 ppm/° C., and particularly preferred is not less than −5 ppm/° C.; furthermore, the preferred upper limit thereof is not greater than 12 ppm/° C., more preferred is not greater than 10 ppm/° C., and particularly preferred is not greater than 8 ppm/° C. Furthermore, because it will make it possible when this is, for example, made into magnetic recording tape to achieve superior dimensional stability with respect to changes in dimensions that would otherwise occur due to changes in ambient temperature and humidity, it is preferred that the direction that satisfies the foregoing coefficient of expansion due to temperature be the width direction of the polyester film.

At the polyester film of the present invention, it is preferred that Young's modulus of the film in at least one of the surfacial directions of the film—preferably the direction in which the foregoing coefficient of expansion due to temperature is not greater than 14 ppm/° C.—be at least not less than 4.5 GPa, and while there is no particular limitation with respect to the upper limit thereof it is ordinarily preferred that this be on the order of 12 GPa. It is particularly preferred that Young's modulus be within a range that is 5 GPa to 11 GPa, and particularly preferred that this be within a range that is 6 GPa to 10 GPa. Outside these ranges, it may be the case that it will be difficult to achieve the aforementioned at and/or $\alpha h$, or that mechanical properties will be inadequate. Such a Young's modulus may be obtained by adjustment which is carried out by means of the aforementioned blending, copolymer composition, and/or stretching, described below.

Furthermore, at the biaxially oriented polyester film of the present invention, where this is used as base film for magnetic tape or the like, it is preferred that the coefficient of expansion due to humidity in at least one of the surfacial directions of the film—preferably the direction in which the foregoing coefficient of expansion due to temperature is not greater than 14 ppm/° C.—be within a range that is 1 to 9.7 (ppm/% RH), more preferred that this be 1.5 to 9.4 (ppm/% RH), and particularly preferred that this be 2.0 to 9.0 (ppm/% RH); and while there is no particular limitation with respect to the lower limit thereof it is ordinarily preferred that this be on the order of 1 (ppm/% RH). Outside these ranges, there will be increase in the change in dimensions that is produced by a change in humidity. Such a coefficient of expansion due to humidity may be obtained by adjustment which is carried out by means of the aforementioned blending, copolymer composition, and/or stretching, described below.

Regarding the direction in which the foregoing coefficient of expansion due to temperature is not greater than 14 ppm/° C., note that it is sufficient that this be satisfied in at least one direction, which as described above is preferably the width direction. Of course, from the perspective of dimensional stability, it is preferred that the coefficient of expansion due to temperature, coefficient of expansion due to humidity, Young's modulus, and so forth also likewise be satisfied in the direction perpendicular to the width direction.

Moreover, when the polyester film is coated with magnetic layer(s), back-coated layer(s), and/or the like, this is heated in an oven so that these might be dried. One conceivable indicator of the operational appropriateness of this drying operation is the percent elongation of the film at 110° C. which is described below. When the percent elongation of the film is high, because there may be occurrence of troughs during the operation that can result in uneven coating, it is better if the percent elongation of the film is low, not greater than 3.0% being preferred. It is preferred that the percent elongation of the film be not greater than 2.5%, more preferred that this be not greater than 2.0%, and still more preferred that this be not greater than 1.5%.

Polyester Film Manufacturing Method

As described above, it is preferred that the polyester film of the present invention be oriented polyester film, and it is particularly preferred that it has been subjected to stretching in the film forming direction and in the width direction so as to increase the molecular orientation thereof in those respective directions. Because it will facilitate increase in the Young's modulus and decrease in the coefficient of expansion due to temperature and coefficient of expansion due to humidity while permitting film formability to be maintained, it is preferred that a method such as the following, for example, be used to manufacture such a polyester film.

First, using the aforementioned polyester composition of the present invention as raw material, this is dried, following which this is supplied to an extruder heated to a temperature that is between the melting point (Tm: ° C.) and (Tm+50)° C. of said aromatic polyester, this being extruded in sheet-like fashion using a T die or other such die, for example. The sheet-like mass extruded therefrom is quenched and allowed to solidify by means of a rotating cooling drum or the like to produce unstretched film, and said unstretched film is then subjected to biaxial stretching.

It being necessary to facilitate the progress of the stretching that takes place thereafter so as to permit achievement of Young's modulus as well as the at and ah and so forth that are defined by the present invention, and as there is a tendency for the crystallization rate of the polyester composition of the present invention to be high, it is preferred from such standpoint that cooling by the cooling drum take place extremely rapidly. It is preferred from such standpoint that this be carried out at low temperature, i.e., 20° C. to 60° C. By carrying this out at such low temperature, it will be possible to suppress occurrence of crystallization while the film is in an unstretched state and cause the stretching that takes place thereafter to be carried out smoothly.

With regard to biaxial stretching, that which is itself known may be employed, it being possible to employ sequential biaxial stretching or simultaneous biaxial stretching.

The description herein will be given in terms of an example of a manufacturing method employing sequential biaxial stretching in which vertical stretching, horizontal stretching, and heat treatment are carried out in this order. It is preferably the case that the initial vertical stretching be carried out by firstly carrying out stretching by a factor of 3× to 8× at a temperature that is between the glass transition temperature (Tg: ° C.) of the polyester copolymer and (Tg+40)° C., that horizontal stretching then be carried out by carrying out stretching by a factor of 3× to 8× at a temperature which is higher than that at which the vertical stretching that was just performed was carried out but which is between (Tg+10)° C. and (Tg+50)° C., and that heat treatment furthermore be carried out for 1 second to 20 seconds at a temperature which is not greater than the melting point of the polyester copolymer but which is between (Tg+50)° C. and (Tg+150)° C., and that heat-setting further be carried out for 1 second to 15 seconds.

Although the foregoing description has been given in terms of an example in which sequential biaxial stretching is carried out, the polyester film of the present invention may also be manufactured by carrying out simultaneous biaxial stretching in which vertical stretching and horizontal stretching are carried out simultaneously, in which case reference might be made to the stretching ratios, stretching temperatures and so forth just described.

Furthermore, the polyester film of the present invention is not limited to single-layer film but may be a laminated film. Where it is a laminated film, two or more varieties of molten polyester might be laminated within die(s) and then extruded in a film-like state, it being preferred that extrusion be carried out at a temperature that is between the respective polyester melting points (Tm: ° C.) and (Tm+70)° C., or two or more varieties of molten polyester might be extruded from die(s) and thereafter laminated, this being quenched and allowed to solidify to produce unstretched laminated film, biaxial stretching and heat treatment then being carried out by a method similar to that employed at the aforementioned single-layer film. Furthermore, where the aforementioned coated layer(s) are provided, it is preferred that the desired liquid coating(s) be applied to one or both surfaces of the aforementioned unstretched film or uniaxially stretched film, and that biaxial stretching and heat treatment thereafter be carried out by a method similar to that employed at the aforementioned single-layer film.

In accordance with the present invention, the foregoing polyester film of the present invention might be used as base film, a nonmagnetic layer and a magnetic layer being formed in this order on one surface thereof, and a back-coated layer being formed on the other surface thereof, or other such procedure being employed to produce magnetic recording tape for data storage or the like.

But, as has been described, the polyester film of the present invention is not limited to single-layer film but may be a laminated film, in which case this will facilitate ability to simultaneously achieve flatness and rollability. For example, by causing a flat surface of low surface roughness to be coated with a magnetic layer, and by causing a rough surface of high surface roughness to be coated with a back-coated layer, the required flatness and transportability will be simultaneously achievable to a higher degree. From such standpoint, where this is to be used as base film for a magnetic recording medium, it is preferred that the upper limit of the range in values for the surface roughness of the rough surface which has high surface roughness be 8.0 nm, more preferred that this be 7.0 nm, and particularly preferred that this be 6.0 nm; and it is preferred that the lower limit thereof be 2.0 nm, more preferred that this be 3.0 nm, and particularly preferred that this be 4.0 nm. Furthermore, it is preferred that the upper limit of the range in values for the surface roughness of the flat surface which has low surface roughness be 5.0 nm, more preferred that this be 4.5 nm, and particularly preferred that this be 4.0 nm; and it is preferred that the lower limit thereof be 1.0 nm, more preferred that this be 1.5 nm, and particularly preferred that this be 2.0 nm. Such surface roughnesses may be adjusted by causing coated layer(s) to be provided at the surface(s), and/or causing inert particles to be present therein and adjusting particle diameter(s) of such inert particles and the amount(s) thereof that are present therein.

The description that follows is given in terms of an example in which the biaxially oriented polyester film of the present invention is a biaxially oriented laminated polyester film.

As specific polyesters other than the aforementioned polyester copolymers, polyethylene terephthalate, polytrimethylene terephthalate, polybutylene terephthalate, and other such polyalkylene terephthalates having alkylene terephthalates as repeating units; and polyethylene-2,6-naphthalene dicarboxylate, polytrimethylene-2,6-naphthalate, polybutylene-2,6-naphthalate, and other such polyalkylene-2,6-naphthalates having alkylene-2,6-naphthalates as repeating units may be cited as preferred examples. Among these, from the perspective of mechanical properties and so forth, polyethylene terephthalate and polyethylene-2,6-naphthalene dicarboxylate are preferred, polyethylene-2,6-naphthalene dicarboxylate being particularly preferred.

To the extent that it does not interfere with the benefit of the present invention, note that the foregoing aromatic polyester in which specific amounts of specific long-chain diol and/or long-chain dicarboxylic acid component(s) are copolymerized and polyester(s) with which other layer(s) are formed may be copolymerized with copolymer component(s) that are themselves known.

WORKING EXAMPLES

The present invention is described in more specific terms by way of the Working Examples and Comparative Examples given below. Note that in accordance with the present invention the following methods were used to measure and evaluate the properties thereof.

(1) Young's Modulus

The film that was obtained was cut into samples of width 10 mm and length 15 cm, and a universal tension testing apparatus (product name: Tensilon; manufactured by Toyo Baldwin) was used to apply tension thereto under the conditions: 100 mm chuck separation, 10 mm/min elongation rate, and chart speed 500 mm/min. Young's modulus was calculated from the tangent at the rising portion of the load-elongation curve that was obtained.

(2) Coefficient of Expansion Due to Temperature (αt)

The film that was obtained was cut into pieces of length 15 mm and width 5 mm in such fashion as to cause the film forming direction of the film and the width direction thereof to respectively be the measured directions, these were placed in a TMA 3000 manufactured by Shinku-Riko, and pretreatment was carried out for 30 minutes at 60° C. in a nitrogen atmosphere (0% RH), following which temperature was decreased to room temperature. Temperature was thereafter increased by 2° C./minute from 25° C. to 70° C., sample lengths at respective temperatures were measured, and the following formula was used to calculate the coefficient of expansion due to temperature (αt). Note that the measured direction was the long direction of the cut samples, 5 measurements being made, the average thereof being used.

$$\alpha t = \{(L_{60} - L_{40})\}/(L_{40} \times \Delta T)\} + 0.5$$

Here, at the foregoing formula, note that $L_{40}$ is the sample length (mm) at 40° C., $L_{60}$ is the sample length (mm) at 60° C., $\Delta T$ is 20 (=60−40)° C., and 0.5 is the coefficient of expansion due to temperature ($\times 10^{-6}/°$ C.) of quartz glass.

(3) Coefficient of Expansion Due to Humidity (αh)

The film that was obtained was cut into pieces of length 15 mm and width 5 mm in such fashion as to cause the film forming direction of the film and the width direction thereof to respectively be the measured directions, these were placed in a TMA 3000 manufactured by Shinku-Riko, sample lengths were respectively measured at humidity 30% RH and humidity 70% RH in a nitrogen atmosphere at 30° C., and the following formula was used to calculate the coefficient of expansion due to humidity. Note that the measured direction was the long direction of the cut samples, 5 measurements being made, the average thereof being taken to be αh.

$$\alpha h = (L_{70} - L_{30})/(L_{30} \times \Delta H)$$

Here, at the foregoing formula, note that $L_{30}$ is the sample length (mm) at 30% RH, $L_{70}$ is the sample length (mm) at 70% RH, and $\Delta H = 40$ (=70−30)% RH.

(4) Identification of Long-Chain Diol Component and Long-Chain Dicarboxylic Acid Component A 20 mg sample was dissolved at room temperature in 0.6 mL of a 1:1 (vol % ratio) solvent mixture of deuterated trifluoroacetic acid:deuterated chloroform, and the amounts of the long-chain diol component and the long-chain dicarboxylic acid components within the film and polymer chips were calculated using $^{1}$H-NMR at 500 MHz.

(5) Intrinsic Viscosity (IV)

Intrinsic viscosity of the film and polyester copolymer that were obtained was determined by using a P-chlorophenol/tetrachloroethane (40/60 wt % ratio) solvent mixture to dissolve the polymer, with measurement being carried out at 35° C.

(6) Glass Transition Temperature (Tg) and Melting Point (Tm)

Glass transition temperature (extrapolated onset temperature) and melting point were measured using a DSC (product name=Thermal Analyst 2100; manufactured by TA Instruments) at a temperature rise rate of 20° C./min with a 10 mg sample.

(7) Percent Elongation of Film at 110° C.

The film that was obtained was cut into pieces of length 20 mm and width 4 mm in such fashion as to cause the film forming direction of the film to be the measured direction, these were placed in an Exstar 6000 manufactured by SII and held at 30° C. in a nitrogen atmosphere (0% RH), following which temperature was increased by 2° C./minute to 150° C. while a stress of 20 MPa was applied thereto in the film forming direction, sample lengths at respective temperatures were measured, and the following formula was used to calculate the degree to which expansion occurred in the length direction based on the film length (L110) at 110° C. versus the film length (L30) after being held at 30° C. but before temperature was increased. The resulting percent elongations of the film that were obtained are shown in TABLE 2.

Percent elongation of film (%)={(L110−L30)/L30}×100

(8) Surface Roughness (Ra)

A noncontact three-dimensional surface profiler (New View 5022 manufactured by Zygo Corporation) was used to carry out measurement under conditions such that measurement magnification was 10× and measurement area was 283 μm×213 μm (=0.0603 mm$^2$), surface analysis software MetroPro internal to said profiler being used to obtain center plane average roughnesses (Ra) for the respective surfaces, average values being recorded such that surface roughness was deemed to be the same when the difference between center line average roughnesses (Ra) was not greater than 0.1 nm.

(9) Film Layer Thickness

For the unstretched film, a microtome (Ultracut-S) was used to a cut a section along the direction perpendicular to the film forming direction thereof, following which an optical microscope was used to calculate the respective thicknesses of Layers A and B. Furthermore, for the oriented laminated polyester film, cutting was carried out in similar fashion, following which a transmission electron microscope was used to calculate the respective thicknesses of Layers A and B, and the thickness ratio dA/dB was determined.

(10) Fabrication of Magnetic Tape

A die coater (tension at time of treatment=20 MPa; temperature=120° C.; speed=200 m/minute) was used to coat the surface on the rough surface layer side of the laminated biaxially oriented polyester film of width 1000 mm and length 1000 m that was obtained at each of the respective Working Examples and Comparative Examples with a back-coated layer coating having the following composition, and this was dried, following which a die coater was used to coat the surface on the flat layer side of the film with a nonmagnetic coating and a magnetic coating having the following compositions while simultaneously varying film thickness, magnetic orientation was performed, and drying was carried out. Moreover, a small-scale test calendaring apparatus (steel roller/nylon roller; 5-roller apparatus) was used to perform calendaring treatment at temperature=70° C. and linear load=200 kg/cm, following which curing was carried out at 70° C. for 48 hours. The foregoing tape was slit so as to be 12.65 mm and assembled in a cassette to obtain magnetic recording tape. Note that coated amounts were adjusted so as to obtain thicknesses of the back-coated layer, the nonmagnetic layer, and the magnetic layer that following drying were respectively 0.5 μm, 1.2 μm, and 0.1 μm.

Composition of Nonmagnetic Coating
  Titanium dioxide microparticles: 100 parts by weight
  S-LEC A (vinyl chloride/vinyl acetate copolymer manufactured by Sekisui Chemical Co., Ltd.: 10 parts by weight
  Nippolan 2304 (polyurethane elastomer manufactured by Nippon Polyurethane Industry Co., Ltd.): 10 parts by weight
  Coronate L (polyisocyanate manufactured by Nippon Polyurethane Industry Co., Ltd.): 5 parts by weight
  Lecithin: 1 part by weight
  Methyl ethyl ketone: 75 parts by weight
  Methyl isobutyl ketone: 75 parts by weight
  Toluene: 75 parts by weight
  Carbon black: 2 parts by weight
  Lauric acid: 1.5 parts by weight
Composition of Magnetic Coating
  Iron (major axis=0.037 μm; acicular aspect ratio=3.5; 2350 oersteds): 100 parts by weight
  S-LEC A (vinyl chloride/vinyl acetate copolymer manufactured by Sekisui Chemical Co., Ltd.: 10 parts by weight
  Nippolan 2304 (polyurethane elastomer manufactured by Nippon Polyurethane Industry Co., Ltd.): 10 parts by weight
  Coronate L (polyisocyanate manufactured by Nippon Polyurethane Industry Co., Ltd.): 5 parts by weight
  Lecithin: 1 part by weight
  Methyl ethyl ketone: 75 parts by weight
  Methyl isobutyl ketone: 75 parts by weight
  Toluene: 75 parts by weight
  Carbon black: 2 parts by weight
  Lauric acid: 1.5 parts by weight
Composition of Back-Coated Layer Coating
  Carbon black: 100 parts by weight
  Thermoplastic polyurethane resin: 60 parts by weight
  Isocyanate Compound: 18 parts by weight (Coronate L manufactured by Nippon Polyurethane Industry Co., Ltd.)
  Silicone oil: 0.5 part by weight
  Methyl ethyl ketone: 250 parts by weight
  Toluene: 50 parts by weight

(11) Electromagnetic Transduction Characteristics

A ½-inch linear system at which heads were secured was employed for measurement of electromagnetic transduction characteristics An electromagnetic induction head (25 μm track width; 0.1 μm gap) was used for recording, and an MR head (8 μm) was used for playback. A head/tape relative speed of 10 m/second was used, a signal of recorded wavelength 0.2 μm was recorded, a spectrum analyzer was used to carry out frequency analysis of the playback signal, the ratio of carrier signal (0.2 μm wavelength) output C and noise N integrated over the entire spectrum was taken to be the C/N ratio, and the value relative to a value of 0 dB for Working Example 1 fabricated according to the method at 11, above, was calculated, evaluation being carried out based on the following criteria.
EXCELLENT=Greater than or equal to +1 dB
GOOD=Greater than or equal to −1 dB but less than +1 dB
BAD=Less than −1 dB

(12) Error Rate

The tape stock material fabricated at (10), above, was slit so as to be 12.65 mm (½ inch) in width, and this was assembled in an LTO case to fabricate a data storage cartridge at which the length of the magnetic recording tape was 850 m. An LTO 5 drive manufactured by IBM was used to carry out recording (0.55 μm recorded wavelength) at ambient conditions of 23° C. and 50% RH on this date storage, and the cartridge was then stored for 7 days at ambient conditions of 50° C. and 80% RH. After storing the cartridge at normal temperature for 1 day, the full length thereof was played back, and the error rate of the signal during playback was measured. The following formula was used to calculate the error rate based on error information (number of erroneous bits) output by the drive. Dimensional stability was evaluated based on the following criteria.
Error rate=(Number of erroneous bits)/(number of bits written thereonto)
EXCELLENT=Error rate was less than $1.0 \times 10^{-6}$
GOOD=Error rate was greater than or equal to $1.0 \times 10^{-6}$ but less than $1.0 \times 10^{-4}$
BAD=Error rate was greater than or equal to $1.0 \times 10^{-4}$

(13) Dropouts (DO)

The data storage cartridge for which error rate was measured at (12), above, was loaded into an LTO 5 drive manufactured by IBM, 14 GB of data signal was recorded thereonto, and this was played back. A signal in which amplitude (P-P value) was 50% or less of the average signal amplitude was taken to be a missing pulse, with four or more consecutive missing pulses being detected as a dropout. Note that dropouts were evaluated for one reel of length 850 m, these being converted into the equivalent number thereof per 1 m, determination being carried out based on the following criteria.
EXCELLENT=Less than 3 dropouts/m
GOOD=Greater than or equal to 3 dropouts/m but less than 9 dropouts/m
BAD=Greater than or equal to 9 dropouts/m Preparation of Polyethylene Naphthalate Pellets A1

Dicarboxylic acid component in the form of dimethyl 2,6-naphthalene dicarboxylate and diol component in the form of ethylene glycol were subjected to transesterification reaction in the presence of titanium tetrabutoxide and then further subjected to polycondensation reaction to prepare polyethylene naphthalate pellets A1 (IV=0.58 dl/g; Tg=115° C.; Tm=263° C.).

Preparation of Polyethylene Terephthalate Pellets A2

Dicarboxylic acid component in the form of dimethyl terephthalate and diol component in the form of ethylene glycol were subjected to transesterification reaction in the presence of titanium tetrabutoxide and then further subjected to polycondensation reaction to prepare polyethylene terephthalate pellets A2 (IV=0.58 dl/g; Tg=76° C.; Tm=254° C.).

Preparation of Sebacic Acid Copolymerized Polyethylene Naphthalate Pellets B1

Dicarboxylic acid component in the form of dimethyl 2,6-naphthalene dicarboxylate and dimethyl sebacate, and diol component in the form of ethylene glycol, were subjected to transesterification reaction in the presence of titanium tetrabutoxide and then further subjected to polycondensation reaction to prepare sebacic-acid-copolymerized polyethylene naphthalate pellets B1. Note that acid component in the form of sebacic acid was present in an amount that was 17 mol %. (IV=0.70 dl/g; Tg=75° C.; Tm=235° C.).

Preparation of Sebacic Acid Copolymerized Polyethylene Terephthalate Pellets B2

Dicarboxylic acid component in the form of dimethyl terephthalate and dimethyl sebacate, and diol component in the form of ethylene glycol, were subjected to transesterification reaction in the presence of titanium tetrabutoxide and then further subjected to polycondensation reaction to prepare sebacic-acid-copolymerized polyethylene terephthalate pellets B2. Note that acid component in the form of sebacic acid was present in an amount that was 17 mol %. (IV=0.65 dl/g; Tg=51° C.; Tm=230° C.).

Preparation of Dodecanedioic Acid Copolymerized Polyethylene Naphthalate Pellets C1

Dicarboxylic acid component in the form of 2,6-naphthalene dicarboxylic acid and dimethyl diol component in the form of ethylene glycol were subjected to transesterification reaction in the presence of titanium tetrabutoxide, dodecanedioic acid and ethylene glycol were added at the stage when distillation of methanol therefrom had ended and the transesterification reaction had ended, and this was subjected to esterification reaction while causing water to be distilled therefrom and then further subjected to polycondensation reaction to prepare dodecanedioic-acid-copolymerized polyethylene naphthalate pellets C1. Note that acid component in the form of dodecanedioic acid was present in an amount that was 16 mol %. (IV=0.77 dl/g; Tg=75° C.; Tm=238° C.).

Preparation of Dodecanedioic Acid Copolymerized Polyethylene Terephthalate Pellets C2

Dicarboxylic acid component in the form of dimethyl terephthalate and diol component in the form of ethylene glycol were subjected to transesterification reaction in the presence of titanium tetrabutoxide, dodecanedioic acid and ethylene glycol were added at the stage when distillation of methanol therefrom had ended and the transesterification reaction had ended, and this was subjected to esterification reaction while causing water to be distilled therefrom and then further subjected to polycondensation reaction to prepare dodecanedioic-acid-copolymerized polyethylene terephthalate pellets C2. Note that acid component in the form of dodecanedioic acid was present in an amount that was 16 mol %. (IV=0.70 dl/g; Tg=50° C.; Tm=231° C.).

Preparation of Hexanediol Copolymerized Polyethylene Naphthalate Pellets D1

Dicarboxylic acid component in the form of dimethyl 2,6-naphthalene dicarboxylate and diol component in the form of ethylene glycol and hexanediol were subjected to transesterification reaction in the presence of titanium tetrabutoxide and then further subjected to polycondensation reaction to prepare hexanediol-copolymerized polyethylene naphthalate pellets D1. Note that diol component in the form of hexanediol was present in an amount that was 36 mol %. (IV=0.44 dl/g; Tg=87° C.; Tm=220° C.).

Preparation of Hexanediol Copolymerized Polyethylene Terephthalate Pellets D2

Dicarboxylic acid component in the form of dimethyl terephthalate and diol component in the form of ethylene glycol and hexanediol were subjected to transesterification reaction in the presence of titanium tetrabutoxide and then further subjected to polycondensation reaction to prepare hexanediol-copolymerized polyethylene terephthalate pellets D2. Note that diol component in the form of hexanediol was present in an amount that was 36 mol %. (IV=0.43 dl/g; Tg=52° C.; Tm=215° C.).

Preparation of Decanediol Copolymerized Polyethylene Naphthalate Pellets E1

Dicarboxylic acid component in the form of dimethyl 2,6-naphthalene dicarboxylate and diol component in the form of ethylene glycol and decanediol were subjected to transesterification reaction in the presence of titanium tetrabutoxide and then further subjected to polycondensation reaction to prepare decanediol-copolymerized polyethylene naphthalate pellets E1. Note that diol component in the form of decanediol was present in an amount that was 25 mol %. (IV=0.49 dl/g; Tg=81° C.; Tm=229° C.).

Preparation of Decanediol Copolymerized Polyethylene Terephthalate Pellets E2

Dicarboxylic acid component in the form of dimethyl terephthalate and diol component in the form of ethylene glycol and decanediol were subjected to transesterification reaction in the presence of titanium tetrabutoxide and then further subjected to polycondensation reaction to prepare decanediol-copolymerized polyethylene terephthalate pellets E2. Note that diol component in the form of decanediol was present in an amount that was 25 mol %. (IV=0.41 dl/g; Tg=50° C.; Tm=211° C.).

Working Example 1

Pellets A1 and B1 were blended so as to cause sebacic acid to be present therein in an amount that was 7 mol %. In other words, pellets A1 nd B1 were blended so as to cause the relative amount (WB) to be 7 mol %, as a result of which the sum (WB+WD) was made to be 7 mol %. Furthermore, at the time that these were blended, true-sphere-shaped silica particles of average particle diameter 0.1 μm were made to be present therein in an amount that was 0.25 mass % as calculated based on the mass of the film, and true-sphere-shaped silica particles of average particle diameter 0.3 μm were made to be present therein in an amount that was 0.1 mass % as calculated based on the mass of the film.

Resin C1 obtained in such fashion was extruded at 290° C. onto a rotating cooling drum, the temperature of which was 60° C., to produce unstretched film. In addition, between two sets of rollers of different rotational speeds in the film forming direction, the unstretched film was heated from above by an IR heater so as to cause the film surface temperature to be 130° C., stretching in the vertical direction (film forming direction) being carried out at a stretching ratio of 4.5× to obtain uniaxially stretched film. In addition, this uniaxially stretched film was guided to a stenter, stretching was carried out at a stretching ratio of 5.0× in the horizontal direction (width direction) at 130° C., and heat-setting treatment was thereafter carried out for 3 seconds at 210° C. to obtain biaxially oriented polyester film of thickness 5.0 μm.

Results for the biaxially oriented polyester that was obtained are shown in TABLE 2.

Working Examples 2-12 and 14; Comparative Examples 1-5

Except for the fact that the conditions shown in TABLE 1 were altered, a procedure similar to that at Working Example 1 was repeated to obtain biaxially oriented polyester film. Results for the biaxially oriented polyester film that was obtained are shown in TABLE 2.

Working Example 13

Polyether imide in the form of "Ultem 1010" manufactured by SABIC Innovative Plastic was prepared. The polyether imide that was prepared and pellets A2 and E2 were blended, the amount of polyether imide that was added being 10 wt % by weight, this being carried out in such fashion as to cause decanediol to be present therein in an amount that was 7 mol %. Furthermore, at the time that these were blended, true-sphere-shaped silica particles of average particle diameter 0.1 μm were made to be present therein in an amount that was 0.25 mass % as calculated based on the mass of the film, and true-sphere-shaped silica particles of average particle diameter 0.3 μm were made to be present therein in an amount that was 0.1 mass % as calculated based on the mass of the film, and, except for the fact that the conditions shown in TABLE 1 were altered, a procedure similar to that at Working Example 1 was repeated to obtain biaxially oriented polyester. Results for the biaxially oriented polyester film that was obtained are shown in TABLE 2.

Working Example 15

Pellets A1 and pellets E1 were blended so as to cause decanediol to be present therein in an amount that was 7 mol %, and so as to cause true-sphere-shaped silica particles of average particle diameter 0.1 μm to be present therein in an amount that was 0.08 mass % as calculated based on mass, to prepare resin 1. Furthermore, pellets A1 and pellets E1 were blended so as to cause decanediol to be present therein in an amount that was 7 mol %, and so as to cause true-sphere-shaped silica particles of average particle diameter 0.1 μm to be present therein in an amount that was 0.12 mass %, and so as to cause true-sphere-shaped silica particles of average particle diameter 0.3 μm to be present therein in an amount that was 0.13 mass %, as calculated based on mass, to prepare resin 2. Resin 1 and resin 2 were respectively extruded at 300° C., these being made to flow together so as to obtain a thickness ratio between resin 1 and resin 2 of 3:7 at the feedblock, these being extruded onto a rotating cooling drum, the temperature of which was 60° C. At this time, this was carried out in such fashion as to cause resin 1 to be surface A, and resin 2 to be surface B. Except for the fact that the conditions shown in TABLE 1 were altered, a procedure similar to that at Working Example 1 was repeated to form biaxially oriented laminated polyester film. Results for the biaxially oriented laminated polyester film that was obtained are shown in TABLE 2.

Working Example 16

Resin 3 in which pellets A2 and true-sphere-shaped silica particles of average particle diameter 0.1 μm were blended so as to cause the true-sphere-shaped silica particles to be present therein in an amount that was 0.08 mass % as calculated based on mass was prepared. Furthermore, pellets A2 and pellets E2 were blended so as to cause decanediol to be present therein in an amount that was 10.3 mol %, and so as to cause true-sphere-shaped silica particles of average particle diameter 0.1 μm to be present therein in an amount that was 0.12 mass %, and so as to cause true-sphere-shaped silica particles of average particle diameter 0.3 μm to be present therein in an amount that was 0.13 mass %, as calculated based on mass, to obtain resin 4. Resin 3 and resin 4 were extruded at 280° C., these being made to flow together so as to obtain a thickness ratio between resin 3 and resin 4 of 3:7 at the feedblock, these being extruded onto a rotating cooling drum, the temperature of which was 25° C. At this time, the amount of decanediol present within the film was 7 mol %. Furthermore, this was carried out in such fashion as to cause resin 3 to be surface A, and resin 4 to be surface B. Except for the fact that the conditions shown in TABLE 1 were altered, a procedure similar to that at Working Example 15 was repeated to form biaxially oriented laminated polyester film. Results for the biaxially oriented laminated polyester film that was obtained are shown in TABLE 2.

Working Example 17

Resin 5 in which pellets A2 and true-sphere-shaped silica particles of average particle diameter 0.1 μm were blended so as to cause decanediol to be 6.5 mol %, and so as to cause the true-sphere-shaped silica particles to be present therein in an amount that was 0.08 mass % as calculated based on mass, was prepared. Furthermore, pellets A2 and pellets E2 were blended so as to cause decanediol to be present therein in an amount that was 8.9 mol %, and so as to cause true-sphere-shaped silica particles of average particle diameter 0.1 μm to be present therein in an amount that was 0.12 mass %, and so as to cause true-sphere-shaped silica particles of average particle diameter 0.3 μm to be present therein in an amount that was 0.13 mass %, as calculated based on mass, to obtain resin 6. Resin 5 and resin 6 were extruded at 280° C., these being made to flow together so as to obtain a thickness ratio between resin 5 and resin 6 of 8:2 at the feedblock, these being extruded onto a rotating cooling drum, the temperature of which was 25° C. At this time, the amount of decanediol present within the film was 7 mol %. Furthermore, this was carried out in such fashion as to cause resin 5 to be surface A, and resin 6 to be surface B.

Except for the fact that the conditions shown in TABLE 1 were altered, a procedure similar to that at Working Example 15 was repeated to form biaxially oriented laminated polyester film. Results for the biaxially oriented laminated polyester film that was obtained are shown in TABLE 2.

TABLE 1

| | Layer A | | | | | | | Layer B | | | | | | | | | | Cooling drum temperature °C | Stretching | | | | Heat-set temperature °C |
|---|---|---|---|---|---|---|---|---|---|---|---|---|---|---|---|---|---|---|---|---|---|---|---|
| | Copolymer component | | | | | | | Copolymer component | | | | | | | Blended component | | | Ratio | | Temperature | | | |
| | Acid component | | | Diol component | | | Pellets used | Acid component | | | Diol component | | | | Resin | Amount added wt% | | MD Ratio | TD Ratio | MD °C | TD °C | | |
| | Component | Number of carbons | Mol fraction mol % | Component | Number of carbons | Mol fraction mol % | | Component | Number of carbons | Mol fraction mol % | Component | Number of carbons | Mol fraction mol % | | | | | | | | | | |
| Working Example 1 | A1/B1 | SA | 10 | 7 | — | — | — | — | — | — | — | — | — | — | — | — | — | 60 | 4.5 | 5.0 | 130 | 130 | 210 |
| Working Example 2 | A1/C1 | DA | 12 | 7 | — | — | — | — | — | — | — | — | — | — | — | — | — | 60 | 4.5 | 5.0 | 130 | 130 | 210 |
| Working Example 3 | A1/D1 | — | — | — | HD | 6 | 7 | — | — | — | — | — | — | — | — | — | — | 60 | 4.5 | 5.0 | 130 | 130 | 210 |
| Working Example 4 | A1/E1 | — | — | — | DD | 12 | 4 | — | — | — | — | — | — | — | — | — | — | 60 | 4.5 | 5.0 | 130 | 130 | 210 |
| Working Example 5 | A1/E1 | — | — | — | DD | 12 | 6 | — | — | — | — | — | — | — | — | — | — | 60 | 4.5 | 5.0 | 130 | 130 | 210 |
| Working Example 6 | A1/E1 | — | — | — | DD | 12 | 7 | — | — | — | — | — | — | — | — | — | — | 60 | 4.5 | 5.0 | 130 | 130 | 210 |
| Working Example 7 | A1/E1 | — | — | — | DD | 12 | 1 | — | — | — | — | — | — | — | — | — | — | 60 | 4.5 | 4.0 | 130 | 130 | 210 |
| Working Example 8 | A1/E1 | — | — | — | DD | 12 | 10 | — | — | — | — | — | — | — | — | — | — | 60 | 4.5 | 5.0 | 130 | 130 | 210 |
| Working Example 9 | A2/B2 | SA | 10 | 7 | — | — | — | — | — | — | — | — | — | — | — | — | — | 25 | 3.6 | 4.0 | 90 | 90 | 210 |
| Working Example 10 | A2/C2 | DA | 12 | 7 | — | — | — | — | — | — | — | — | — | — | — | — | — | 25 | 3.6 | 4.0 | 90 | 90 | 210 |
| Working Example 11 | A2/D2 | — | — | — | HD | 6 | 7 | — | — | — | — | — | — | — | — | — | — | 25 | 3.6 | 4.0 | 90 | 90 | 210 |
| Working Example 12 | A2/E2 | — | — | — | DD | 12 | 7 | — | — | — | — | — | — | — | — | — | — | 25 | 3.6 | 4.0 | 90 | 90 | 210 |
| Working Example 13 | A2/E2 | — | — | — | DD | 12 | 7 | — | — | — | — | — | — | — | — | — | — | 25 | 3.8 | 4.2 | 100 | 100 | 210 |
| Working Example 14 | A2/C2/E2 | DA | 12 | 3.5 | DD | 12 | 3.5 | — | — | — | — | — | — | — | — | — | — | 25 | 3.6 | 4.0 | 90 | 90 | 210 |
| Working Example 15 | A1/E1 | — | — | — | DD | 12 | 7 | A1/E1 | — | — | — | DD | 12 | 7 | — | — | 60 | 4.5 | 5.0 | 130 | 130 | 210 |
| Working Example 16 | A2 | — | — | — | — | — | — | A2/E2 | — | — | — | DD | 12 | 10.3 | — | — | 25 | 3.6 | 4.0 | 90 | 90 | 210 |
| Working Example 17 | A2/l2 | — | — | — | DD | 12 | 6.5 | A2/E2 | — | — | — | DD | 12 | 8.9 | PET | 10 | 25 | 3.6 | 4.0 | 90 | 90 | 210 |
| Comparative Example 1 | A2 | — | — | — | — | — | — | — | — | — | — | — | — | — | — | — | 25 | 3.6 | 4.0 | 90 | 90 | 210 |

TABLE 1-continued

| | | Layer A | | | | | | | | | Layer B | | | | | | | | | | | | | Stretching | | | | |
|---|---|---|---|---|---|---|---|---|---|---|---|---|---|---|---|---|---|---|---|---|---|---|---|---|---|---|---|---|
| | | Copolymer component | | | | | | | | | Copolymer component | | | | | | | | | | | | | Ratio | | Temperature | | Heat-set |
| | | Acid component | | | Diol component | | | | | Acid component | | | Diol component | | | | Blended component | | | | | | | | | | | temper- |
| | Pellets used | Compo-nent | Number of carbons | Mol frac-tion mol % | Compo-nent | Number of carbons | Mol frac-tion mol % | | Pellets used | Compo-nent | Number of carbons | Mol frac-tion mol % | Compo-nent | Number of carbons | Mol frac-tion mol % | | Resin | Amount added wt % | | Cooling drum temper-ature °C. | | MD Ratio | TD Ratio | MD °C. | TD °C. | | ature °C. |
| Comparative Example 2 | A1 | — | — | — | — | — | — | | — | — | — | — | — | — | — | | — | — | | 60 | | 4.5 | 4.0 | 130 | 130 | | 210 |
| Comparative Example 3 | A1/B1 | SA | 10 | 20 | — | — | — | | — | — | — | — | — | — | — | | — | — | | 60 | | 3.5 | 4.5 | 120 | 120 | | 200 |
| Comparative Example 4 | A1/E1 | — | — | — | DD | 12 | 20 | | — | — | — | — | — | — | — | | — | — | | 60 | | 3.5 | 4.5 | 120 | 120 | | 200 |
| Comparative Example 5 | A1/E1 | — | — | — | DD | 12 | 1.5 | | — | — | — | — | — | — | — | | — | — | | 60 | | 4.5 | 4.0 | 130 | 130 | | 210 |

TABLE 2

| | Film thickness μm | Young's modulus GPa | | Coefficient of expansion due to temperature (αt) ×10⁶/°C. | | Coefficient of expansion due to humidity (αh) ×10⁶/% RH | |
|---|---|---|---|---|---|---|---|
| | | MD | TD | MD | TD | MD | TD |
| Working Example 1 | 5.0 | 5.5 | 7.6 | 22.7 | 8.0 | 11.7 | 8.9 |
| Working Example 2 | 5.0 | 5.5 | 7.6 | 22.2 | 5.5 | 10.9 | 8.3 |
| Working Example 3 | 5.0 | 5.8 | 7.7 | 18.2 | 8.0 | 11.8 | 8.7 |
| Working Example 4 | 5.0 | 5.9 | 7.9 | 15.9 | 5.4 | 11.6 | 8.8 |
| Working Example 5 | 5.0 | 5.8 | 7.8 | 18.4 | 6.5 | 11.0 | 8.7 |
| Working Example 6 | 5.0 | 5.8 | 7.7 | 18.4 | 7.0 | 10.5 | 8.6 |
| Working Example 7 | 5.0 | 6.6 | 5.5 | 13.2 | 20.5 | 9.6 | 10.8 |
| Working Example 8 | 5.0 | 5.5 | 7.5 | 19.1 | 4.4 | 10.2 | 8.5 |
| Working Example 9 | 5 0 | 4.8 | 5.8 | 15.6 | 8.6 | 11.5 | 9.4 |
| Working Example 10 | 5.0 | 4.8 | 5.8 | 15.4 | 8.4 | 11.6 | 9.5 |
| Working Example 11 | 5.0 | 4.9 | 5.8 | 14.4 | 8.1 | 11.4 | 9.6 |
| Working Example 12 | 5.0 | 4.9 | 5.8 | 14.8 | 8.5 | 11.2 | 9.4 |
| Working Example 13 | 5.0 | 4.9 | 5.8 | 15.0 | 8.7 | 11.3 | 9.5 |
| Working Example 14 | 5.0 | 4.9 | 5.8 | 14.7 | 8.4 | 11.1 | 9.3 |
| Working Example 15 | 5.0 | 5.8 | 7.7 | 18.4 | 7.0 | 10.5 | 8.6 |
| Working Example 16 | 5.0 | 5.0 | 5.8 | 13.8 | 8.3 | 10.8 | 9.2 |
| Working Example 17 | 5.0 | 4.8 | 5.7 | 15.2 | 8.8 | 11.0 | 9.1 |
| Comparative Example 1 | 5.0 | 5.0 | 6.0 | 12.6 | 5.8 | 12.1 | 10.2 |
| Comparative Example 2 | 5.0 | 7.6 | 6.1 | 4.8 | 11.9 | 9.5 | 11.9 |
| Comparative Example 3 | 5.0 | 5.2 | 7.0 | 18.1 | 8.5 | 12.9 | 9.7 |
| Comparative Example 4 | 5.0 | 5.3 | 7.2 | 17.5 | 7.5 | 12.7 | 9.3 |
| Comparative Example 5 | 5.0 | 7.5 | 6.0 | 5.4 | 12.7 | 9.4 | 11.8 |

| | Percent elongation of film % MD | Ra nm | Electromagnetic transduction characteristics | Error rate | Dropouts |
|---|---|---|---|---|---|
| Working Example 1 | 1.3 | 4.3 | — | EXCELLENT | EXCELLENT |
| Working Example 2 | 1.3 | 4.3 | GOOD | EXCELLENT | EXCELLENT |
| Working Example 3 | 1.1 | 4.2 | GOOD | EXCELLENT | EXCELLENT |
| Working Example 4 | 1.0 | 4.1 | GOOD | EXCELLENT | EXCELLENT |
| Working Example 5 | 1 1 | 4.2 | GOOD | EXCELLENT | EXCELLENT |
| Working Example 6 | 1.1 | 4.2 | GOOD | EXCELLENT | EXCELLENT |
| Working Example 7 | 1.0 | 4.3 | GOOD | EXCELLENT | EXCELLENT |
| Working Example 8 | 1.2 | 4.4 | GOOD | EXCELLENT | EXCELLENT |
| Working Example 9 | 1.6 | 4.2 | GOOD | EXCELLENT | EXCELLENT |
| Working Example 10 | 1.6 | 4.3 | GOOD | EXCELLENT | EXCELLENT |
| Working Example 11 | 1.4 | 4.3 | GOOD | EXCELLENT | EXCELLENT |

TABLE 2-continued

| | | | | | |
|---|---|---|---|---|---|
| Working Example 12 | 1.4 | 4.2 | GOOD | EXCELLENT | EXCELLENT |
| Working Example 13 | 1.2 | 4.3 | GOOD | EXCELLENT | EXCELLENT |
| Working Example 14 | 1.1 | 4.2 | GOOD | EXCELLENT | EXCELLENT |
| Working Example 15 | 1.1 | 2.6 (surface A) 5.0 (surface B) | EXCELLENT | EXCELLENT | EXCELLENT |
| Working Example 16 | 1.2 | 2.5 (surface A) 4.9 (surface B) | EXCELLENT | EXCELLENT | EXCELLENT |
| Working Example 17 | 1.3 | 2.3 (surface A) 5.0 (surface B) | EXCELLENT | EXCELLENT | EXCELLENT |
| Comparative Example 1 | 0.7 | 4.4 | GOOD | BAD | BAD |
| Comparative Example 2 | 0.5 | 4.3 | GOOD | BAD | BAD |
| Comparative Example 3 | 4.6 | 4.0 | — | — | — |
| Comparative Example 4 | 3.9 | 4 0 | — | — | — |
| Comparative Example 5 | 0.6 | 4.3 | GOOD | BAD | BAD |

At TABLE 1, MD indicates the film forming direction of the film; TD indicates the width direction of the film; at Working Examples 15-17 in TABLE 1, the surface on the A layer side did not come in contact with the cooling drum, this being indicated as surface A at TABLE 2, and the surface on the B layer side came in contact with the cooling drum, this being indicated as surface B at TABLE 2; and at TABLE 1, SA refers to sebacic acid, DA refers to dodecanedioic acid, HD refers to hexanediol, DD refers to decanediol, and PEI refers to polyether imide.

INDUSTRIAL UTILITY

Because the polyester composition of the present invention and a polyester film employing same more easily permit achievement of dimensional stability, and in particular excellent dimensional stability with respect to changes in environment, e.g., changes in temperature and/or humidity, and the percent elongation of the film at 110° C. is moreover low, and are such that uneven coating during coating operations tends not to occur, they are suitable for use in applications in which a high degree of dimensional stability—including with respect to the effects of humidity and temperature—is sought; e.g., as base film for high-density magnetic recording media or the like.

The invention claimed is:

1. A polyester composition characterized in that primary repeating units therein comprise an aromatic dicarboxylic acid component (Component A) and an ethylene glycol component (Component C); a long-chain alkyl dicarboxylic acid component having from 6 to 14 carbons (Component B) or a long-chain alkyl diol component having from 6 to 14 carbons (Component D) is present therein; and a sum (WB+WD) of a relative amount (WB) of Component B as calculated based on a total number of moles of Component A and Component B plus a relative amount (WD) of Component D as calculated based on a total number of moles of Component C and Component D is within a range of 2 mol % to 13 mol %.

2. The polyester composition according to claim 1, wherein at least one species selected from the group consisting of polyimide, polyether imide, polyether ketone, and polyether ether ketone is present in an amount within a range of 0.5 wt % to 25 wt % as calculated based on mass of the polyester composition.

3. A polyester film wherein the polyester composition according to claim 1 is employed in at least one layer thereof.

4. The polyester film according to claim 3, having a Young's modulus in at least one surfacial direction of the film of not less than 4.5 GPa.

5. The polyester film according to claim 3, having a percent elongation in a long direction of the film at 110° C. of not greater than 3.0%.

6. The polyester film according to claim 3, having a coefficient of expansion due to humidity in at least one surfacial direction of the film of 1 ppm/% RH to 10.0 ppm/% RH, and a coefficient of expansion due to temperature in at least one direction of not greater than 14 ppm/° C.

7. The polyester film according to claim 3 that is capable of being used in a base film for a magnetic recording medium.

8. A magnetic recording medium comprising the polyester film according to claim 7 and a magnetic layer formed on one surface thereof.

9. A polyester film provided with a film layer comprising the polyester composition according to claim 1.

10. The polyester film according to claim 9, having a Young's modulus in at least one surfacial direction of the film of not less than 4.5 GPa.

11. The polyester film according to claim 9, having a percent elongation in a long direction of the film at 110° C. of not greater than 3.0%.

12. The polyester film according to claim 9, having a coefficient of expansion due to humidity in at least one surfacial direction of the film of 1 ppm/% RH to 10.0 ppm/% RH, and a coefficient of expansion due to temperature in at least one direction of not greater than 14 ppm/° C.

13. The polyester film according to claim 9, wherein at least one species selected from the group consisting of polyimide, polyether imide, polyether ketone, and polyether ether ketone is present in the polyester composition in an amount within a range of 0.5 wt % to 25 wt % as calculated based on mass of the polyester composition.

14. The polyester film according to claim 9, wherein the long-chain alkyl dicarboxylic acid component (Component B) has a structure that does not contain a branched chain.

15. A magnetic recording medium comprising the polyester film according to claim 9 and a magnetic layer formed on one surface thereof.

16. The polyester film according to claim 9, wherein the long-chain alkyl diol component (Component D) has a structure that does not contain a branched chain.

17. A laminated film wherein the polyester composition according to claim 1 is employed in at least two layers thereof.

18. The laminated film according to claim 17, having a Young's modulus in at least one surfacial direction of the laminated film of not less than 4.5 GPa.

19. The laminated film according to claim 17, having a percent elongation in a long direction of the laminated film at 110° C. of not greater than 3.0%.

* * * * *